United States Patent [19]

Fox et al.

[11] 4,291,912
[45] Sep. 29, 1981

[54] WIND DEFLECTOR FOR SUN ROOF

[75] Inventors: Robert M. Fox, Dryden; Robert D. Mogk, Holly; Edward T. Priebe, Mount Clemens, all of Mich.

[73] Assignee: General Motors Corporation, Detroit, Mich.

[21] Appl. No.: 144,400

[22] Filed: Apr. 28, 1980

[51] Int. Cl.³ .............................................. B60J 7/22
[52] U.S. Cl. .................... 296/217; 296/1 S; 98/2.14
[58] Field of Search ................ 296/1 S, 91, 217; 98/2.11, 2.12, 2.14, 2.15

[56] References Cited

U.S. PATENT DOCUMENTS

| | | | |
|---|---|---|---|
| 3,156,175 | 11/1964 | Werner | 98/2 |
| 3,186,753 | 6/1965 | Steffanoff | 296/1 S |
| 3,711,150 | 1/1973 | Parks | 296/217 |
| 3,874,723 | 4/1975 | Coenen | 296/217 |
| 3,973,478 | 8/1976 | Götz | 296/217 X |
| 3,981,531 | 9/1976 | Koral et al. | 296/217 |
| 4,176,876 | 12/1979 | Sorensch | 296/217 |

Primary Examiner—Joseph F. Peters, Jr.
Assistant Examiner—Norman L. Staok, Jr.
Attorney, Agent, or Firm—Charles E. Leahy

[57] ABSTRACT

A wide deflector for a vehicle body having a roof opening selectively closed by a movable closure panel includes a molded plastic deflector body having a mounting portion attached to the roof outer panel forward of the roof opening and cantilevered rearwardly above the roof opening. The deflector body also includes a deflecting vane which overlies the roof opening and is connected to the mounting portion by a hinge axis extending transversely of the vehicle body above the roof opening to permit movement of the deflecting vane between the stowed position in parallel overlying relationship with the closure panel and an angularly raised position which disposes the deflecting vane in a wind-deflecting attitude above the roof opening. A spring acts between the mounting portion and the deflecting vane and urges the deflecting vane to the angularly raised wind-deflecting attitude. The deflecting vane has an operating leg portion which extends forwardly therefrom across the hinge axis for engagement by the closure panel during closing movement to pivot the deflecting vane about the hinge axis to the lowered position overlying the closed closure panel. During opening movement, the closure panel is withdrawn rearwardly away from engagement with the operating leg portion and permits the spring to raise the deflecting vane to the wind-deflecting position. The wind deflector body is preferably of one-piece molded plastic construction with the body mounting and the deflecting vane portions connected by an integral living hinge.

2 Claims, 4 Drawing Figures

WIND DEFLECTOR FOR SUN ROOF

This invention relates to a wind deflector mounted on the vehicle body at the leading edge of a roof opening which is selectively opened and closed by a sliding closure panel.

BACKGROUND OF THE INVENTION

It is well known in motor vehicles to provide an opening in the vehicle body roof generally above the front seat of the occupant compartment. The roof opening is selectively opened and closed by a closure panel which is mounted on the vehicle roof for fore and aft sliding movement.

The prior art also recognizes that the wind deflector may be mounted on the exterior of the vehicle roof in order to minimize intrusion into the occupant compartment and to enable aftermarket installation of the deflector. Furthermore, the prior art has recognized that the wind deflector may be retractable in a manner to cause the wind deflector to be automatically elevated to the wind-deflecting position when the roof closure panel is opened and the wind deflector is automatically lowered to a flush or concealed position when the closure panel is moved forwardly to the closed position.

SUMMARY OF THE INVENTION

The present invention provides a new and improved wind deflector which is automatically raised and lowered by movement of the closure panel and which is of economical construction and adapted for original equipment or after-market installation on the vehicle body.

According to the invention, the wind deflector includes a molded plastic deflector body having a mounting portion attached to the roof outer panel forward of the roof opening and cantilevered rearwardly above the roof opening. The deflector body also includes a deflecting vane which overlies the roof opening and is connected to the mounting portion by a hinge axis extending transversely of the vehicle body above the roof opening to permit movement of the deflecting vane between the stowed position in parallel overlying relationship with the closure panel and an angularly raised position which disposes the deflecting vane in a wind-deflecting attitude above the roof opening. A spring acts between the mounting portion and the deflecting vane and urges the deflecting vane to the angularly raised wind-deflecting attitude. The deflecting vane has an operating leg portion which extends forwardly therefrom across the hinge axis. During closing movement of the closure panel, the closure panel engages the operating leg portion and pivots the deflecting vane about the hinge axis to the lowered position overlying the closure panel. During opening movement of the closure panel, the closure panel is withdrawn rearwardly away from engagement with the operating leg portion and permits the spring to raise the deflecting vane to the wind-deflecting position. The wind deflector body is preferably of one-piece molded plastic construction with the body mounting and the deflecting vane portions connected by an integral living hinge.

The object, feature and advantage of the invention resides in the provision of an automatically raised and lowered wind deflector for a sun roof opening which is mounted wholly on the outside of the vehicle body to facilitate after-market installation.

Another object, feature and advantage of the invention resides in the provision of an automatically raised and lowered wind deflector for a vehicle body roof opening which is economically constructed of one-piece injection molded plastic having an integral living hinge.

Another object, feature and advantage of the invention resides in the provision of an automatically raised and lowered wind deflector for a vehicle body roof opening in which the deflector is mounted on the outside of the vehicle body to facilitate maintenance and repair and to minimize intrusion of the sun roof structure into the vehicle occupant compartment.

DESCRIPTION OF THE DRAWINGS

These and other objects, features and advantages of the invention will become apparent on consideration of the following specification and the appended drawings in which.

DESCRIPTION OF THE PREFERRED EMBODIMENT

Figure 1:
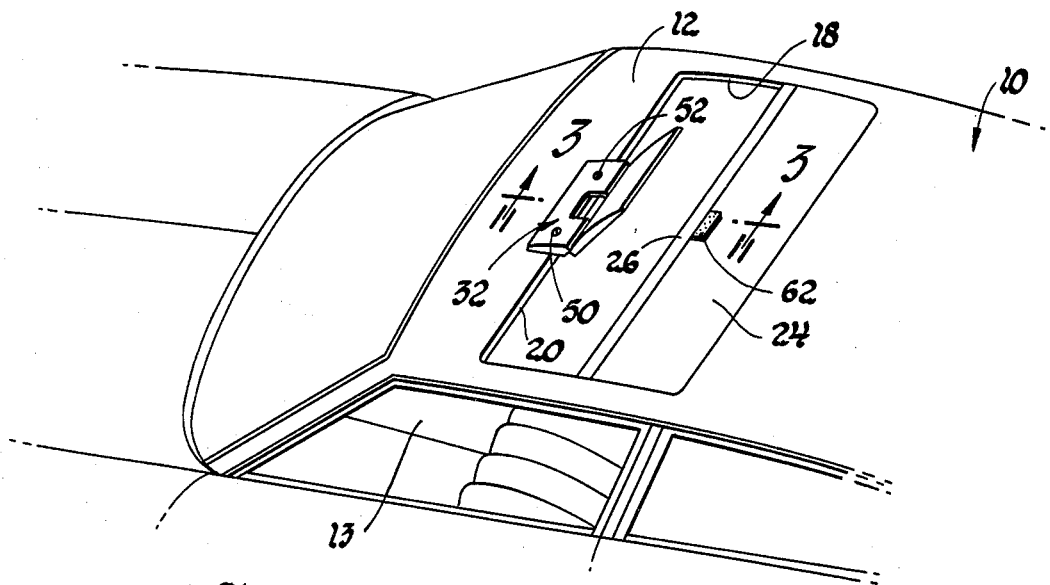
FIG. 1 is a perspective view of a vehicle body showing the sun roof closure panel in partially open position and the wind deflector in an angularly raised wind-deflecting position.
Figure 2:
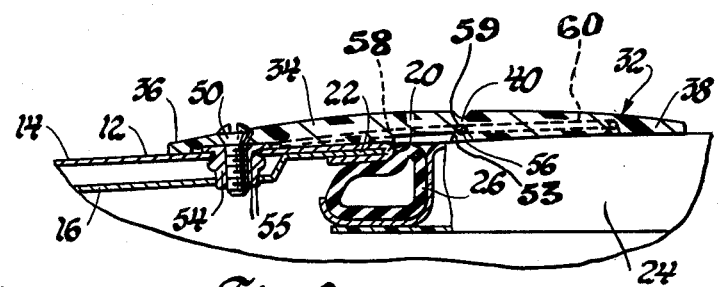
FIG. 2 is a cross-sectional view taken through the wind deflector showing the lowered position when the closure panel is at the full-forward closed position thereof.

Referring to FIG. 1, there is shown a motor vehicle body generally indicated at 10 and having a roof structure 12 which encloses a vehicle occupant compartment 13. As best seen in FIG. 2, the roof structure 12 is defined by a roof outer panel 14 and a roof inner panel 16. A roof opening 18 is provided in the roof structure 12 and, as best seen in FIG. 2, has the leading edge 20 thereof defined by a hem flange 22.

A closure panel 24 is provided for selectively opening and closing the roof opening 18. In FIG. 2 it is seen that the closure panel 24 is moved full-forwardly and is vertically raised so that a compressible seal 26 carried on the peripheral edge of the closure panel 24 is compressed against the roof structure hem flange 22.

Figure 3:
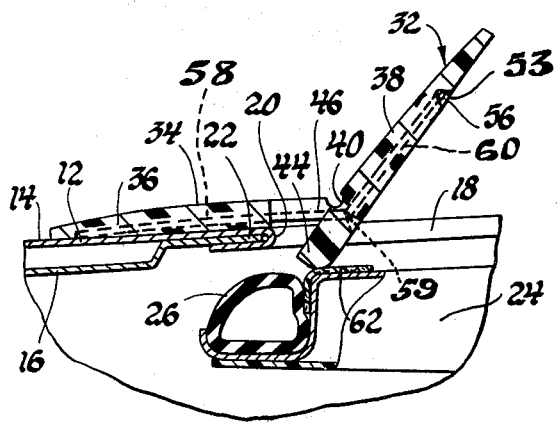
FIG. 3 is a sectional view taken in the direction of the arrows 3—3 of FIG. 1 and showing the sun roof closure panel during movement approaching the fully closed position.

In FIG. 3, the closure panel 24 is shown somewhat lowered away from the roof structure hem flange 22 in readiness for rearward sliding movement to the open position shown in FIG. 1.

Figure 4:
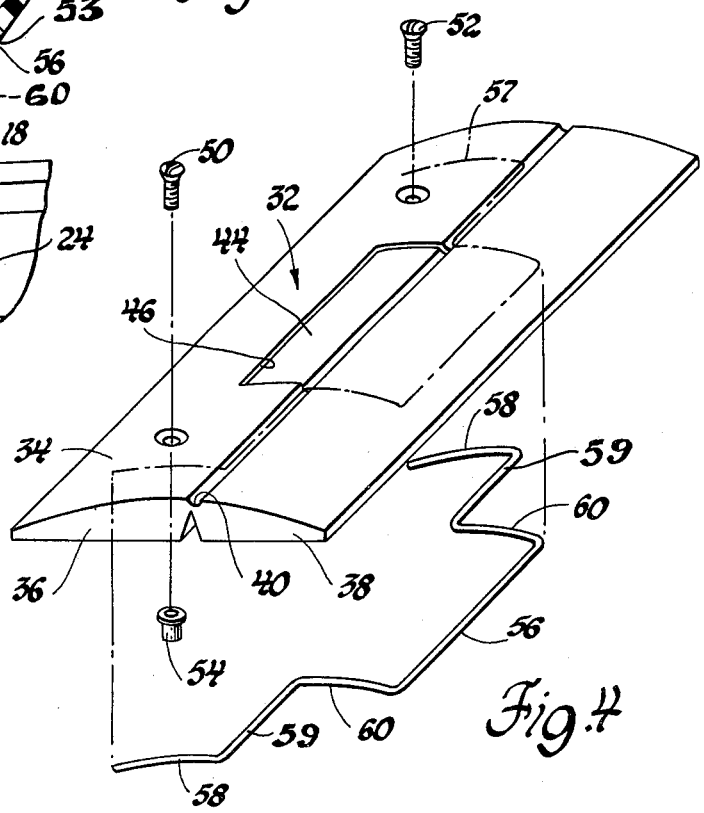
FIG. 4 is a perspective view of the wind deflector and the operating spring thereof.

A preferred mechanism for operating the closure panel 24 between the open position of FIG. 1 and the closed position of FIG. 2 is described in Koral et al. U.S. Pat. No. 3,981,531 granted Sept. 21, 1976, and incorporated by reference herein. According to the present invention, a wind deflector 32 is provided for deflecting the oncoming airstream upwardly above the roof opening 18 when the closure panel 24 is in the open position. As best seen in FIGS. 2 and 4, the wind deflector 32 includes a molded plastic deflector 34 including a forward mounting portion 36 and a rearward deflecting vane portion 38 which are joined together by an integral living hinge 40. As best seen in FIGS. 2 and 4, the deflecting vane portion 38 includes an operating leg portion 44 at the center thereof which extends forwardly of the axis of living hinge 40 into a recess 46 provided in the mounting portion 36.

Referring to FIG. 2, it is seen that the deflector 34 is mounted on the vehicle body 10 by a pair of mounting screws 50 and 52 which are threadedly engaged in collapsible nuts 54 which are inserted through holes 55 drilled through the roof outer panel 14 and roof inner panel 16. As seen in FIGS. 2 and 3, the mounting location of the deflector 32 is such that the mounting portion 36 is cantilevered rearwardly beyond the leading edge 20 of the roof opening 18 so that the living hinge 40 is situated above the roof opening 18. Furthermore, as best seen in FIG. 3, the location of the deflector 34 is such that the operating leg portion 44 of the deflector vane portion 38 is also located rearwardly of the roof opening leading edge 20 so that the deflecting vane portion 38 may pivot about the living hinge 40 to the angularly raised position shown in FIG. 3.

As best seen in FIG. 4, a spring 56 constructed of bent spring wire is associated with the deflector 34. The deflector 34 has a recess 53 formed in the bottom face thereof along the phantomline indicated path designated 57 for receiving the spring 56. The spring 56 has a pair of mounting legs 58 which seat within the recess 53 and are trapped between the roof outer panel 14 and the deflector mounting body portion 36. The spring 56 also includes a pair of bias legs 60 which seat within the recess 53 and engage the deflector vane portion 38. The spring also includes torsion rod portions 59 which underlie the axis of living hinge 40 and act upon the bias legs 60 to urge the deflector vane portion 38 upwardly to the position of FIG. 3.

Referring to FIG. 3, it will be understood that when the closure panel 24 is lowered away from the roof structure 12 in readiness for rearward sliding movement to the open position, the spring 56 is permitted to raise the deflector vane portion 38 to the angularly raised wind-deflecting position shown in FIGS. 1 and 3.

When the closure panel 24 is raised vertically from the position shown in FIG. 3 to the closed position of FIG. 2, the closure panel 24 engages with the operating leg portion 44 of the deflector vane portion 38 and causes the deflector vane portion 38 to pivot about the living hinge 40 to the position of FIG. 2 in which the deflector vane portion 38 overlies the closure panel 24.

As best seen in FIG. 3, a protective tape 62 may be applied to the leading edge of the closure panel 24 to protect the painted surface thereof against wear by repeated engagement with the deflector operating leg portion 44.

Thus it is seen that the invention provides a new and improved wind deflector for vehicle body sun roof closure panels.

While this invention has been disclosed primarily in terms of the specific embodiments shown in the drawings, it is not intended to be limited thereto, but rather only to the extent set forth in the appended claims. For example, while the invention is shown herein as comprised of an injection molded one-piece plastic deflector having an integral living hinge, it is within the scope of the invention to employ separate deflector portions joined by other suitable hinge devices. Furthermore, it will be understood that the dimensional characteristics of the deflector, including the length, width, and height thereof, will vary with the aerodynamic characteristics of the vehicle body. Furthermore, it will be understood that the deflector of this invention is not limited to use in vehicle sun roofs in which the final mode of closing movement of the leading closure panel edge is in the vertical direction. The deflector may also be employed in conjunction with those sun roof operating mechanisms in which the closure panel moves horizontally into the fully-closed position.

The embodiments of the invention in which an exclusive property or privilege is claimed are defined as follows:

1. A wind deflector for a vehicle body having a roof panel defining a roof opening, a closure panel adapted to close the roof opening, and means for moving the closure panel between a rearward and lowered open position and a forward and raised closed position, said wind deflector comprising:

a deflector mounting body adapted for overlying attachment on the roof panel forward of the roof opening and extending rearwardly above the roof opening, a deflecting vane adapted to overlie the roof opening, hinge means joining the mounting body and the deflecting vane and defining a hinge axis extending transversely of the vehicle body above the roof opening to permit movement of the deflecting vane between a stowed position in parallel overlying relationship with the closure panel and an angularly raised position adapted to dispose the deflecting vane in wind-deflecting attitude above the roof opening, spring means situated wholly above the roof panel and acting between the mounting body and the deflecting vane and adapted to urge the deflecting vane to the angularly raised wind-deflecting attitude, and an operating leg portion associated with the deflecting vane and extending forwardly across the hinge axis so that the operating leg portion extend downwardly into the roof opening for engagement by the closure panel when the deflecting vane is disposed in the angularly raised position by the spring means, whereby the wind deflecting vane is automatically lowered against the bias of the spring to the normal stowed position by engagement of the closure panel with the operating leg portion upon closing movement of the closure panel and raised to the deflecting attitude by the spring means upon opening movement of the closure panel moving the closure panel out of engagement with the operating leg portion.

2. A wind deflector for a vehicle body having a roof panel defining a roof opening, a closure panel adapted to close the roof opening, and means for moving the closure panel between a rearward and lowered open position and a forward and raised closed position, said wind deflector comprising:

a molded plastic deflector body having a forward mounting portion adapted for overlying attachment on the roof panel forward of the roof opening and cantilevered rearwardly above the roof opening and a rearward deflecting portion adapted to overlie the roof opening, an integral living plastic hinge joining the mounting portion and the deflecting portion and defining a hinge axis extending transversely of the vehicle body above the roof opening to permit movement of the deflecting portion between a stowed position in parallel overlying relationship with the closure panel and an angularly raised position adapted to dispose the deflecting portion in wind deflecting attitude above the roof opening, spring means situated wholly above the roof panel and having a base portion suitably fixed to the mounting portion and leg means extending into operating engagement with the deflecting portion and adapted to urge the deflecting portion to the angularly raised wind-deflecting attitude, and an operating leg portion integral with the deflecting portion and extending forwardly across the hinge axis so that the operating leg portion extend downwardly into the roof opening for engagement by the closure panel when the deflecting vane is disposed in the angularly raised position by the spring means, whereby the wind deflecting vane is automatically lowered against the bias of the spring to the normal stowed position by engagement of the closure panel with the operating leg portion upon closing movement of the closure panel and raised to the deflecting attitude by the spring means upon opening movement of the closure panel moving the closure panel out of engagement with the operating leg portion.

* * * * *